United States Patent
Bienert et al.

(10) Patent No.: US 6,709,038 B2
(45) Date of Patent: Mar. 23, 2004

(54) LOADING SYSTEM FOR THE CARGO SPACE OF A MOTOR VEHICLE

(75) Inventors: Horst Bienert, Gauting (DE); Stefan Schwenk, Berg (DE); Gerd Leuprecht, Planegg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/809,037

(22) Filed: Mar. 16, 2001

(65) Prior Publication Data

US 2001/0033085 A1 Oct. 25, 2001

(30) Foreign Application Priority Data

Mar. 16, 2000 (DE) .......................... 100 12 767

(51) Int. Cl.$^7$ ................................. B60R 5/04
(52) U.S. Cl. ..................... 296/26.1; 296/26.11
(58) Field of Search ............ 296/26.08, 26.09, 296/26.1, 26.11, 26.12, 26.13, 26.14, 26.15, 37.1; 414/522

(56) References Cited

U.S. PATENT DOCUMENTS

| | | | |
|---|---|---|---|
| 2,094,401 A | | 9/1937 | Girl |
| 3,006,487 A | | 4/1961 | Gelli |
| 3,627,158 A | | 12/1971 | Kobasic |
| 3,807,592 A | * | 4/1974 | Lynn et al. ............ 414/462 |
| 3,870,178 A | * | 3/1975 | Ellen ..................... 414/462 |
| 4,616,972 A | | 10/1986 | McFarland |
| 4,725,183 A | * | 2/1988 | Smillie, III ........... 296/37.1 |
| 4,753,567 A | * | 6/1988 | Achee, Sr. ............ 414/462 |
| 4,887,526 A | * | 12/1989 | Blatt .................... 108/44 |
| 5,301,992 A | * | 4/1994 | Whitmore ............. 296/37.1 |
| 6,299,138 B1 | * | 10/2001 | Huang et al. ......... 254/126 |

FOREIGN PATENT DOCUMENTS

| | | |
|---|---|---|
| DE | 296 08 955 U1 | 11/1996 |
| DE | 196 07 899 A1 | 9/1997 |
| DE | 197 49 158 A1 | 5/1998 |
| DE | 197 31 324 A1 | 3/1999 |
| DE | 198 15 466 A1 | 10/1999 |
| DE | 198 58 308 A1 | 6/2000 |

* cited by examiner

Primary Examiner—D. Glenn Dayoan
Assistant Examiner—Hilary L Gutman
(74) Attorney, Agent, or Firm—Nixon Peabody LLP; David S. Safran

(57) ABSTRACT

A loading system for a cargo space of a motor vehicle, such as a passenger vehicle includes a pull-out cargo floor and a guide system for longitudinally moving the cargo floor from a rest position into an extended position projecting out of the cargo space. The guide system, in the area of the end that is extended out of the cargo space, can be upwardly pivoted with respect to the cargo space while the opposite end is vertically fixed with respect to the cargo space.

10 Claims, 4 Drawing Sheets

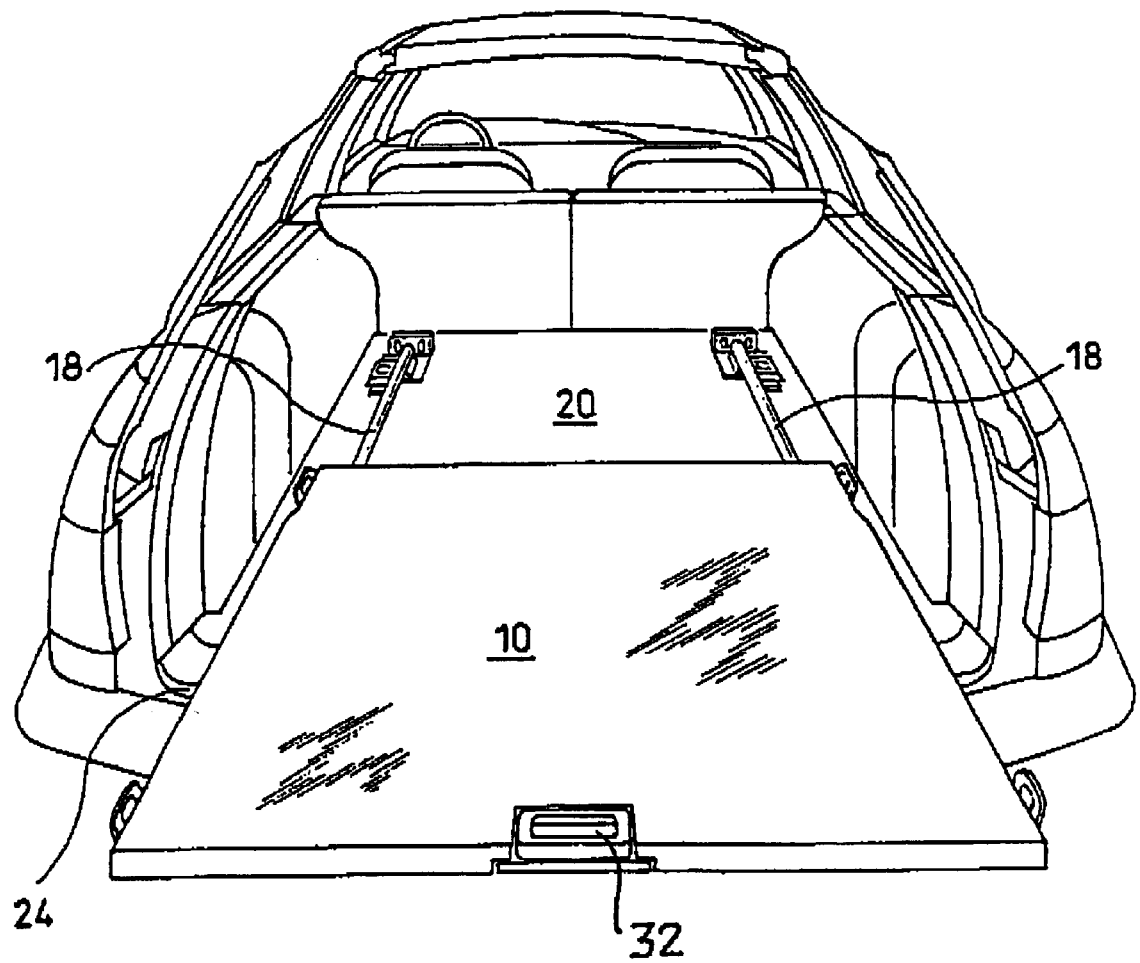

LOADING SYSTEM FOR THE CARGO SPACE OF A MOTOR VEHICLE

BACKGROUND OF THE INVENTION

1. Field of the Invention

The present invention is directed to a loading system for a cargo space of a motor vehicle, such as a passenger vehicle.

2. Description of the Prior Art

A conventional loading system for a passenger vehicle is known from German Utility Model DE 296 08 955 U1, whereby a cargo floor is supported to be removable in a horizontal direction in a horizontally aligned frame which can be raised parallel to the motor vehicle roof by means of a scissors-type mechanism driven by an electric motor.

Another generic loading system for a passenger vehicle is known from published German Patent Application DE 197 31 324 A1, whereby a cargo floor is supported to be removable in the horizontal direction by rollers along support rails. In order to raise the cargo floor from a lowered rest position to an extended state over a loading edge, the support rails can be vertically displaced parallel to the motor vehicle bottom via two parallelogram rods by means of an adjustment cylinder, whereby the cargo floor can then be pulled out in the raised position.

Published German Patent Application DE 196 07 899 A1 discloses a conventional prior art loading system for an ambulance and includes a frame, and a treatment table. The treatment table, which can be pulled out to the rear, is movably supported, can be raised or lowered via two pivotally mounted support arms, both parallel to the vehicle bottom via an adjustment cylinder, and also can be pivoted about an axis which runs in the transverse direction of the motor vehicle.

The disadvantage in each of these known loading systems is that the lifting means for a cargo floor in the design of the loading system, for practical loads, must be made relatively stable and thus costly.

German Patent Publication DE 197 49 158 A1 discloses another conventional loading system for a passenger vehicle in which the cargo floor can be pulled out in the horizontal direction parallel to the vehicle bottom on several rollers mounted on the vehicle. The disadvantage in this vertically fixed loading system is the fact that, in the presence of the loading edge, the entire loading space of the motor vehicle cannot be used.

SUMMARY OF THE INVENTION

In view of the foregoing, it is a primary object of the present invention to provide a loading system for a cargo space of a motor vehicle, such as a passenger vehicle, in which a cargo floor can be pulled out, and further including a guide system for the cargo floor designed such that it can be made simple and economical, on the one hand, and on the other, even when a loading edge is present, as little cargo space as possible is lost.

These and other objects are achieved in accordance with the present invention by a loading system including a pull-out cargo floor movably supported with respect to the cargo space via a guide system, whereby the guide system, in a withdrawal-side area, can be raised with respect to the cargo space via an actuatable lifting mechanism before the cargo floor is pulled out of a rest position over a loading edge and is made stationary in the vehicle-side area with respect to the motor vehicle body. The present invention is advantageous because the guide system can only be raised in the withdrawal-side area with respect to the motor vehicle body, the corresponding lifting mechanism can be made relatively simple and economical even for large loads, while still provisions are made for a certain vertical adjustability in order to better enable use of the cargo space than in a vertically-fixed cargo floor when a loading edge is present.

BRIEF DESCRIPTION OF THE DRAWINGS

FIG. 8 is a perspective view of a vehicle equipped with the loading system in accordance with the present invention.

DETAILED DESCRIPTION OF THE PREFERRED EMBODIMENTS

Figure 1:
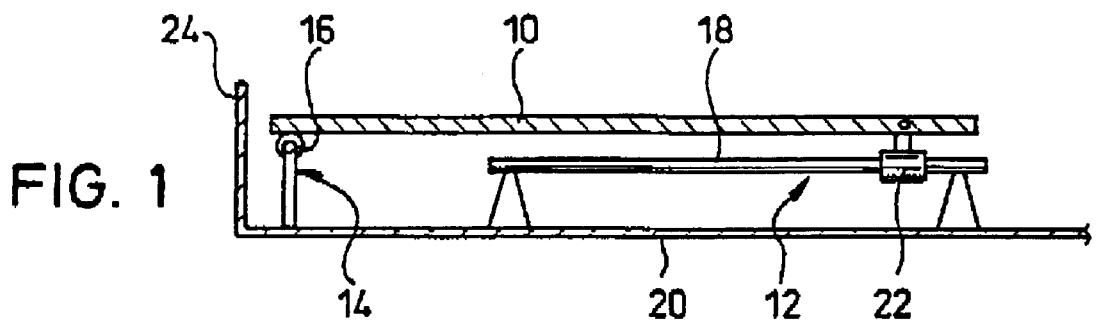
FIG. 1 is a schematic side view of a first embodiment of a loading system in accordance with the present invention in a rest position.
Figure 2:
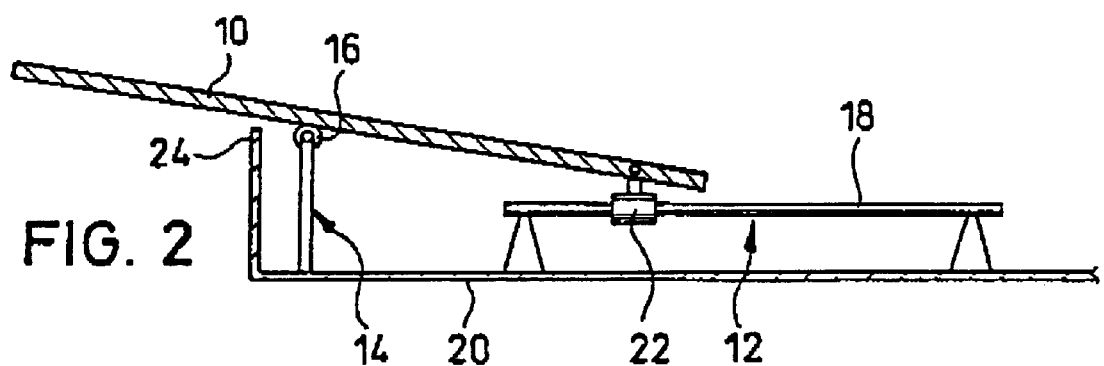
FIG. 2 shows the loading system from FIG. 1 in a partially extended state.

FIGS. 1 & 2 show a first embodiment of a loading system in accordance with the present invention that includes a cargo floor 10 movably supported to be pulled outwardly of the rear cargo space of a motor vehicle via a guide system 12. A rear section of the system 12 includes a lifting means 14 which, in the rest position shown in FIG. 1, supports a rear end of the cargo floor 10 by way of a roller system 16. A front section of the system 12 includes, at the vehicle-side areas, a guide element 18 which extends longitudinally horizontally and which is fixedly connected to a floor 20 of the cargo space, and preferably, is formed in the shaped of a guide rod. A sliding element 22 is pivotally connected to the cargo floor 10 and is movably supported along the guide rod 18. Preferably, the sliding element 22 is guided along the guide rod 18 by way of a linear bearing system formed of linear guide bushes or linear roller bearing bushes.

In the rest position when not pulled out in the cargo space of the vehicle, which is shown in FIG. 1, the cargo floor 10 is in essentially parallel alignment to the floor 20 of the cargo space, the top edge of the cargo floor 10 lying in a plane below the top edge of the loading edge 24 which terminates the cargo space and the floor 20 thereof to the rear. For loading or unloading the cargo space, the roller system 16 is lifted upward by the lifting means 14 to a level of the top edge of the loading edge 24 so that accordingly the lower edge of the cargo floor 10 is raised above the level of the loading edge. Finally, in this position, the cargo floor 10 can be pulled out to the rear (to the left in the figures), the cargo floor 10 moving over the roller system 16 and the sliding element 22 sliding forward on the guide rod 18. FIG. 2 shows an intermediate position between the rest position which is shown in FIG. 1 and a position with the cargo floor 10 completely pulled out. In the extended state, the cargo floor 10 can be loaded with a load which by reversal of the above described sequences can be moved into the cargo space of the motor vehicle.

Figure 7:
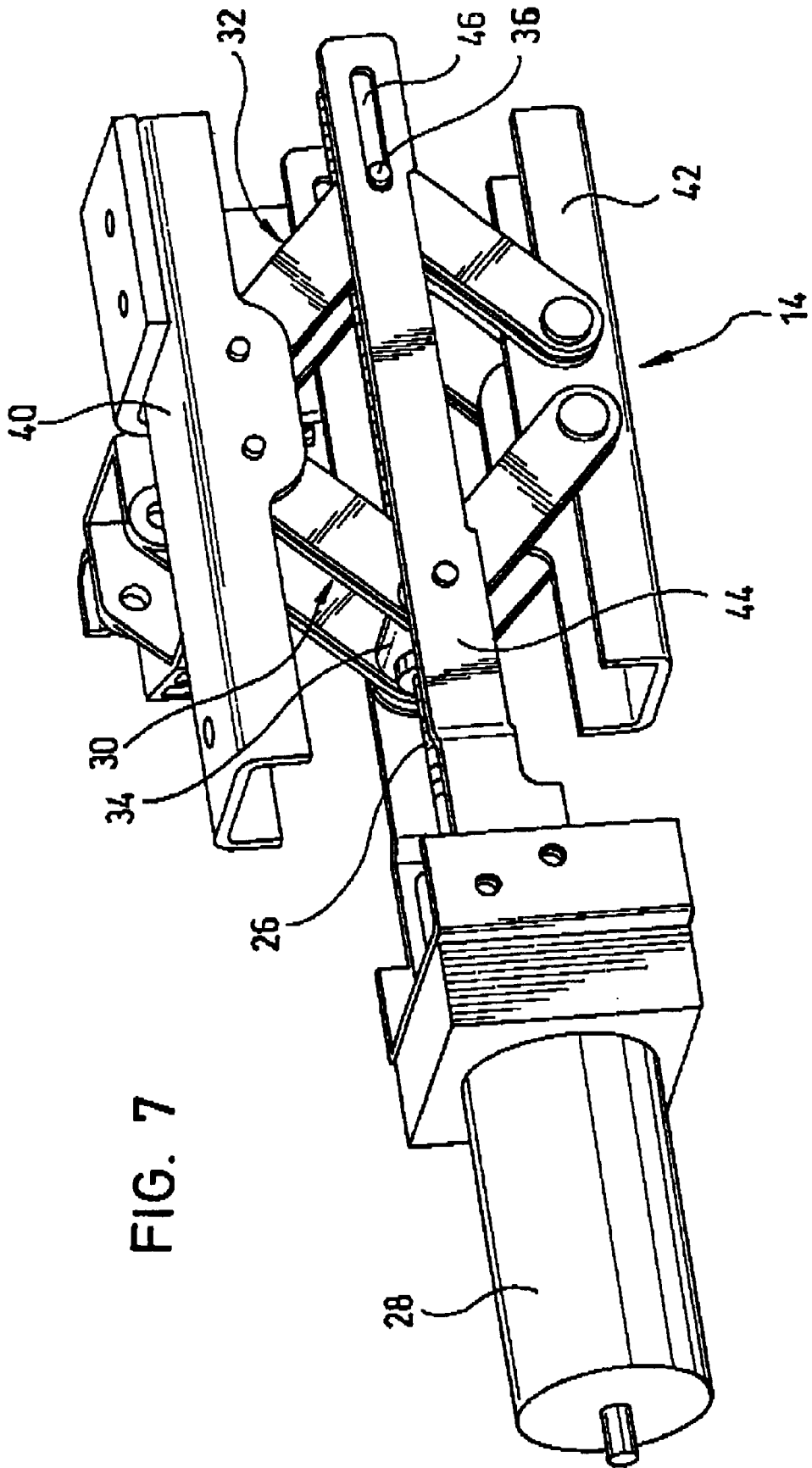
FIG. 7 is a schematic perspective of a lifting mechanism for use in the loading systems in accordance with the present invention in a raised state.

FIG. 7 shows an embodiment of a lifting means 14 and includes a scissors-type mechanism with a trapezoidal spindle 26 driven by an electric motor 28 into rotational motion. The lifting means 14 also include two articulated lever pairs 30, 32 arranged symmetrically to one another. Disposed between each of the articulated lever pair 30, 32 is a pin 34, 36 in which the spindle 26 fits. The articulated lever pairs 30, 32 are each coupled at respective ends to an upper profile 40 and a lower profile 42. The lower profile 42 is mounted to the motor vehicle floor, while the upper profile 40 carries the roller system 16 (not shown in FIG. 7). The motor 28 and the spindle 26 are supported by a carrier 44 which is fixedly connected to the pin 34, while a distal end of the pin 36 is guided in an elongated slot 46 in the carrier 44. By way of the described scissors-type system, the rotary motion of the spindle 26 is converted into a vertical adjustment of the upper profile 40 with respect to the lower profile 42, and thus, the roller system 16 moves vertically upward with respect to the bottom floor 20 of the cargo space. Preferably, the lifting means 14 is designed for loads up to at least 600 kg. Because the lifting means 14 is required to lift and lower only an end of the cargo floor 10 and not the entire cargo floor 10, the lifting means 14 can be designed relatively economically for loads of this magnitude.

The trapezoidal spindle 26 runs in a transverse direction of the motor vehicle, i.e., transversely to the direction in which the cargo floor 10 is pulled out. On the other side of the cargo floor 10, a second lifting means 14, which corresponds to the one shown in FIG. 7, is arranged symmetrically to the first lifting means 14. The two trapezoidal spindles 26 can each be driven via its own electric motor or a common electric motor. Alternatively to the trapezoidal spindles, compressively-stiff drive cables, as used for the actuation of sliding motor vehicle roofs, can be utilized.

As shown in FIG. 8, the cargo floor 10 can be pulled outward or retracted manually via a corresponding handle 32, or the cargo floor 10 can be moved electrically using an electric motor 30 (see FIG. 4) which drives a pinion which engages two compressively stiff drive cables 31 which laterally engage the vehicle-side end of the cargo floor 10 or on its sliding element 122. These drive devices can be made similarly to the cover of an openable motor vehicle roof. In doing so, there can be a common electric motor 30 for two drive cables 31, or, laterally on the back end of the cargo floor 10, each can have its own electric motor. Alternatively, every embodiment can include a one-sided drive when provisions are made for guiding the cargo floor 10 without tilting.

In the embodiment shown in FIGS. 1 and 2, with a horizontally running guide rod 18, the cargo floor 10 can be aligned horizontally in the rest position according to FIG. 1, but it is tilted relative to horizontal in the pulled-out state, as shown in FIG. 2. This tilting can be reduced by the guide rod 18 not being horizontal, but rising to the rear in the direction of extension of the cargo floor 10 according to the embodiment shown in FIGS. 3 & 4, and, by lowering the front end of the guide rod 18 of guide system 112 relative to the position shown in FIG. 1 and 2. By a corresponding extension of the sliding element 122, this lowering for the rest position can be balanced so that horizontal alignment of the cargo floor 10 is possible (see FIG. 3).

Figure 4:
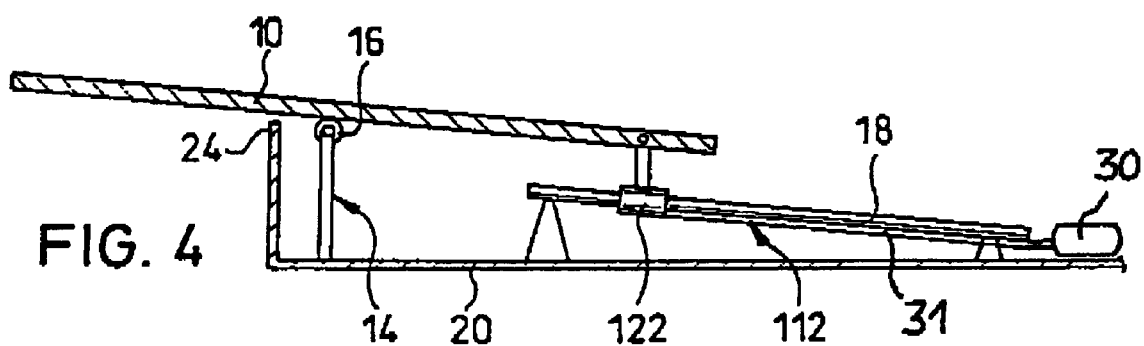
FIG. 4 shows the loading system from FIG. 3 in a partially extended state.

In the extended state shown in FIG. 4, the extension of the sliding element 122, in interplay with the tilt of the guide rod 18, results in the cargo floor 10 being less strongly inclined relative to the horizontal when extended. Greater reduction of the tilt relative to the horizontal in the extended state can be achieved by the back end of the guide rod 18 being placed higher and/or the sliding element 122 being extended upward so that the front end of the cargo floor, in the rest position, is above the level of the back end, i.e., is oriented descending to the rear.

Figure 5:
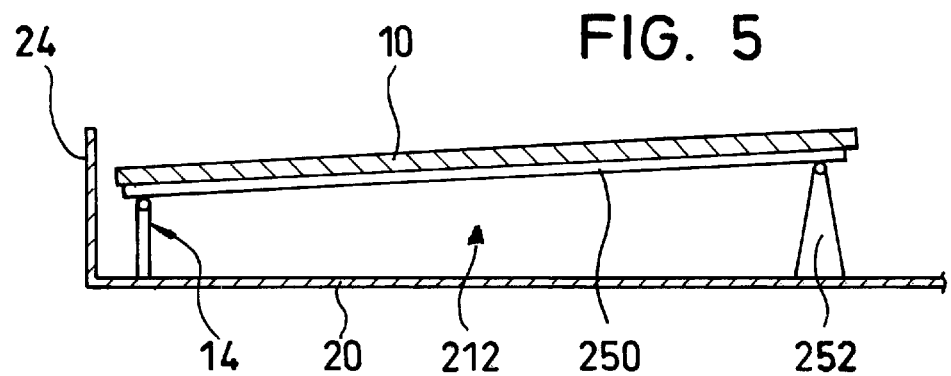
FIG. 5 is a schematic side view of a third embodiment of a loading system in accordance with the present invention in a rest position.
Figure 6:
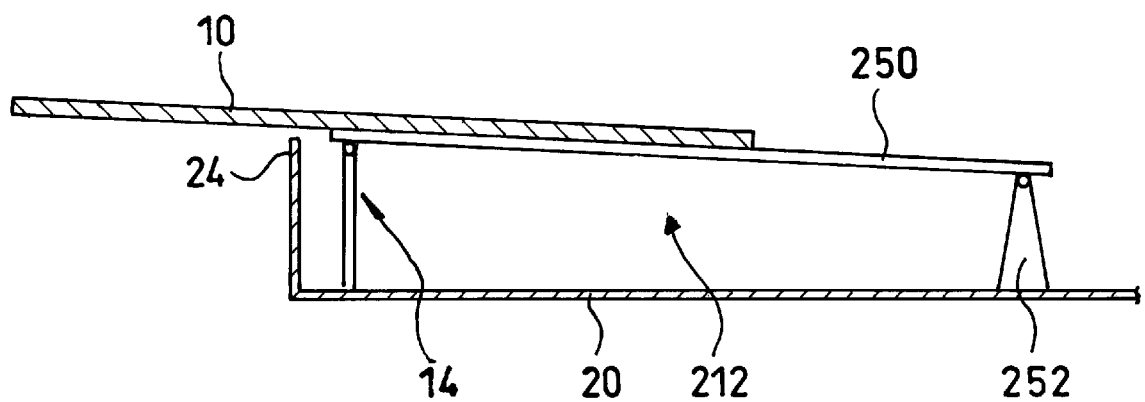
FIG. 6 shows the loading system from FIG. 5 in a partially extended state.

FIGS. 5 & 6 show an alternative embodiment of the invention in which a guide system 212 for the cargo floor 10 is formed using a single guide element 250 which is pivotally mounted, but vertically fixed, on a vehicle-mounted bearing 252 in a front area and is supported in a rear area by the lifting means 14. As shown in FIG. 5, the guide system 212 is made such that a front bearing point of the guide element 250 lies on the bearing 252 in a plane above the level of the support point on the lifting means 14 so that the cargo floor 10 is tilted downward to the rear of the cargo area of the motor vehicle with respect to the horizontal. This has the advantage that in a raised, extended position of the cargo floor 10 (see FIG. 6), the downward tilt of the cargo floor 10 relative to the horizontal is less than would be the case for the guide element 250 which is oriented horizontally in the rest position.

Figure 3:
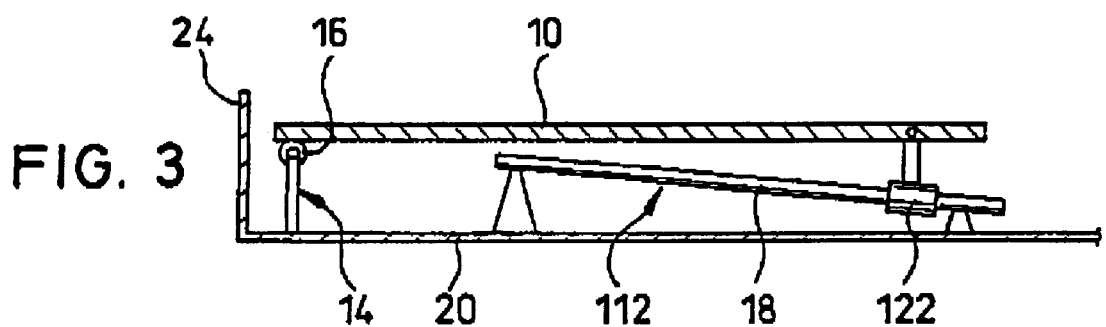
FIG. 3 is a schematic side view of a second embodiment of a loading system in accordance with the present invention in a rest position.

Of course in this one-piece guide system embodiment, a horizontal alignment in the rest position is possible, as is the case in the embodiments shown in FIGS. 1–3. In addition, the guide element 250 can be a straight guide rail, guide rod or the like (a respective one of these guide elements being located on each side of the cargo floor 10), but embodiments are also possible in which the guide element 250 is formed by a frame which extends under essentially the entire cargo floor 10.

What is claimed is:

1. A loading system for a cargo space of a motor vehicle comprising:

a cargo floor;

a guide system for supporting and longitudinally moving said cargo floor with respect to the motor vehicle from a rest position which lies inside of the cargo space of the motor vehicle to an extended position in which the cargo floor projects outside of the cargo space of the motor vehicle, said guide system being supported entirely within said cargo space and including a lifting means for lifting one end of said cargo floor upwardly with respect to the cargo space of the motor vehicle while a first end of the guide system is vertically fixed for enabling said cargo floor to be moved by said guide system into said extended position, said guide system further comprising a first guide element fixedly attached so as to be stationary with respect to the cargo space of the motor vehicle at said first end, and a second guide element movably supported for vertical movement by said lifting means at a second end, said cargo floor being supported by said first guide element and said second guide element for movement along an inclined path from said rest position within said cargo space into said extended position projecting outward from within said cargo space, said second guide element being a roller; wherein said second guide element supports said cargo floor essentially at one point.

2. The loading system as claimed in claim 1, wherein said first end is mounted for pivotal movement with respect to said cargo space of the motor vehicle, and wherein said second end of said guide system is movably supported for vertical movement by said lifting means.

3. A loading system for a cargo space of a motor vehicle comprising:

a cargo floor;

a guide system for supporting and longitudinally moving said cargo floor with respect to the motor vehicle from a rest position which lies inside of the cargo space of the motor vehicle to an extended position in which the cargo floor projects outside of the cargo space of the motor vehicle, said guide system being supported entirely within said cargo space and including a lifting means for lifting one end of said cargo floor upwardly with respect to the cargo space of the motor vehicle while a first end of the guide system is vertically fixed for enabling said cargo floor to be moved by said guide system into said extended position, said guide system further comprising a first guide element fixedly attached so as to be stationary with respect to the cargo space of the motor vehicle at said first end, and a second guide element movably supported for vertical movement by said lifting means at a second end, said cargo floor being supported by said first guide element and said second guide element for movement along an inclined path from said rest within said cargo space into said extended position projecting outward from within said cargo space, said second guide element being a roller; wherein said first guide element forms a guideway which rises upwardly with respect to the cargo space of the motor vehicle.

4. The loading system as claimed in claim 3, wherein said first guide element is a guide rod and includes a linear bearing system on which said cargo floor is movably supported.

5. The loading system as claimed in claim 1, wherein said lifting means comprises a scissors-type mechanism having two articulated lever pairs arranged symmetrically with respect to other.

6. The loading system as claimed in claim 5, wherein said two articulated lever pairs are attached on each side of said cargo floor.

7. The loading system as claimed in claim 6, wherein each of said two articulated lever pairs is driven by a spindle.

8. The loading system as claimed in claim 7, wherein said two articulated lever pairs includes a separate electric motor for driving a respective spindle.

9. The loading system as claimed in claim 8, wherein said spindle extends transversely with respect to said extended position.

10. The loading system as claimed in claim 9, wherein said loading system is constructed to be able to support a load having a mass of at least 600 kg.

* * * * *